US005451627A

United States Patent [19]

Jamasbi

[11] Patent Number: 5,451,627
[45] Date of Patent: Sep. 19, 1995

[54] AQUEOUS FAST DRYING AEROSOL COATING COMPOSITION COMPRISING A BLEND OF ACRYLIC POLYMERS

[75] Inventor: Homayoun Jamasbi, Blue Bell, Pa.

[73] Assignee: Rohm and Haas Company, Phildelphia, Pa.

[21] Appl. No.: 278,468

[22] Filed: Jul. 21, 1994

[51] Int. Cl.⁶ ............................................. C08K 3/20
[52] U.S. Cl. .................................. 524/389; 524/365; 524/804; 524/841; 524/903; 525/191; 525/194; 428/500; 428/523
[58] Field of Search ............... 524/365, 389, 804, 841, 524/903; 525/191, 194; 428/500, 523

[56] References Cited

U.S. PATENT DOCUMENTS

| | | | |
|---|---|---|---|
| 4,136,075 | 1/1979 | Finn et al. | 524/389 |
| 4,136,076 | 1/1979 | Daniels | 524/389 |
| 4,166,882 | 9/1979 | Das et al. | 524/817 |
| 4,177,178 | 12/1979 | Das et al. | 524/820 |
| 4,187,204 | 2/1980 | Howard | 260/22 |
| 4,240,940 | 12/1980 | Vasishth et al. | 260/22 |
| 4,265,797 | 5/1981 | Suk | 524/389 |
| 4,363,887 | 12/1982 | Leep | 523/402 |
| 4,365,028 | 12/1982 | Leep | 523/402 |
| 4,420,575 | 12/1983 | Rapaport et al. | 523/504 |
| 4,450,253 | 5/1984 | Suk | 524/378 |
| 4,482,662 | 11/1984 | Rapaport et al. | 523/504 |
| 4,578,415 | 3/1986 | Learner | 524/322 |
| 4,968,735 | 11/1990 | Page et al. | 524/55 |
| 5,002,998 | 3/1991 | Carey et al. | 524/555 |
| 5,071,900 | 12/1991 | Page et al. | 524/378 |
| 5,158,609 | 10/1992 | O'Neill | 106/401 |
| 5,250,599 | 10/1993 | Swartz | 524/366 |

FOREIGN PATENT DOCUMENTS

375010A1 12/1989 European Pat. Off. .
353477A1 2/1990 European Pat. Off. .
439026A2 1/1991 European Pat. Off. .
61-34473 8/1986 Japan .

OTHER PUBLICATIONS

Rohm and Haas Company Literature, 1983 on Acrysol (R) WS-24 Acrylic Copolymer Dispersion Resin.
Polymer, 1987, Alcohol-Water Cosolvent Systems for Poly(Methyl Methacrylate), John M. G. Cowie et al., Butterworth & Co.
The Characterization of Polymers, Rohm and Haas Literature, 1976.
Rohm and Haas Co. Literature, J5. Influence of Diluent and of Copolymer Composition on the Glass Temperature of a Polymer System, TG Fox.

Primary Examiner—Melvyn I. Marquis
Assistant Examiner—Randy Gulakowski
Attorney, Agent, or Firm—Sudhir G. Deshmukh

[57] ABSTRACT

An aqueous aerosol coating composition, which includes a thermoplastic acrylic polymer solubilized in an aqueous solution of a monohydric alcohol. The coating composition may further be blended with a controlling amount of a water soluble or water reducible acrylic polymer for imparting a desired degree of gloss and alkali resistance to a coating made from the aqueous aerosol coating composition The compositions of this invention provide for improved drying rates, hardness and alkali resistance over current aqueous systems.

9 Claims, No Drawings

AQUEOUS FAST DRYING AEROSOL COATING COMPOSITION COMPRISING A BLEND OF ACRYLIC POLYMERS

This invention generally relates to aqueous, also known as water-based, aerosol coating compositions and, more particularly, to a gloss-controlled aerosol coating composition having improved drying capability, hardness and alkali resistance over current water-based systems.

Aerosol paint compositions that employ volatile organic solvents as a carrier and propellant for film-forming polymers are known and widely used. However, the presence of organic solvents in aerosol compositions raise serious environmental concerns due to their toxic nature. Moreover, since such organic solvents are highly flammable, they create hazardous workplace conditions. While aqueous aerosol paint compositions have had some impact in resolving the problems of toxicity and flammability, a continuing concern is the longer drying times typically observed in water-based systems when compared to the faster drying times of organic solvent-based aerosol systems.

Furthermore, high gloss aerosol paint compositions, which are typically solvent based, are generally not suitable for coating solvent-sensitive surfaces, such as the surfaces of leather substrates. The present invention addresses this problem by providing for high gloss aerosol paint compositions that do not damage or mar such underlying solvent-sensitive substrate surfaces.

A variety of polymers such as acrylics, alkyds, epoxy esters, and vinyl polymers and copolymers may be used in aqueous aerosol compositions as film-forming polymers, which are also known as film formers. Water-based aerosol paint formulations having a mixture of dimethyl ether, water and a water-soluble solvent, such as monohydric alcohol, as a carrier and a propellant are known. The dimethyl ether-based propellant system is said to provide for water-soluble (WS) polymers and water-dilutable [also known as water-reducible (WR)] emulsion polymers that are useful as film-forming polymers.

U.S. Pat. No. 4,450,253 (the Suk patent) describes a film-forming polymer comprising an oil-modified acrylic ester polymer rendered water-soluble by neutralization with a base, such as ammonia or an amine. This film-forming polymer is applied to a substrate by employing a single phase, water-based carrier and propellant system having dimethyl ether, water and water-soluble polar organic solvents. The Suk patent at column 6, lines 56 through 64 erroneously identified a Rohm and Haas Company product, Acrysol® WS-24 acrylic dispersion resin as an oil-modified acrylic acid ester suitable as a film-forming polymer. This is an erroneous identification of the chemical composition of Acrysol® WS-24 acrylic dispersion resin, which is typically supplied at 36% solids in water and is not oil-modified. Also, it is not oil-modified in any variation of the invention as described in the Suk patent.

Furthermore, there is no suggestion in the Suk patent that an acrylic dispersion resin, not modified by oil, can be employed as a film-forming polymer. However, a critical aspect of the invention in the Suk patent is to film-forming polymers that must be oil-modified ester polymers which are solubilized and dissolved in the liquid phase propellant-solvent solution provided by the dimethyl ether, water and at least one polar solvent, such as monohydric alcohol, (Specification, column 5, lines 32 through 37). Therefore, since Acrysol® WS-24 acrylic dispersion resin is not oil-modified its identification as a drying oil-modified polymer was in error.

The present invention is directed to an aqueous aerosol coating composition comprising a thermoplastic acrylic polymer solubilized in an aqueous solution of a monohydric alcohol to form a solubilized acrylic solution, the thermoplastic acrylic polymer having a weight average molecular weight in the range of 105,000 to 200,000.

The aqueous aerosol coating composition further comprises a blend of the solubilized acrylic solution with a controlling amount of a water-based acrylic polymer for providing a desired degree of gloss and alkali resistance, the water-based acrylic polymer being selected from the group consisting of a water-soluble acrylic polymer, water-reducible acrylic polymer and a combination thereof.

The present invention is also directed to a method of producing an aqueous coating composition comprising, adding a monohydric alcohol to water form an aqueous solution, solubilizing a thermoplastic acrylic polymer having a weight average molecular weight in the range of 105,000 to 200,000 in the aqueous solution to form a solubilized acrylic solution, blending a controlling amount of a water-based acrylic polymer with the solubilized acrylic solution to provide a desired degree of gloss and alakli resistance to a coating resulting from the aqueous coating composition.

While aqueous-based carrier and propellant systems have made some improvements over organic solvent-based systems, further improvements in drying time as measured by set-time, dry-to-touch time and tack-free time are required. The present invention addresses the problems of longer drying times typically observed in conventional aqueous aerosol systems, which utilize oil modified acrylics as film formers.

The present invention further provides for environmentally safe aqueous aerosol coating compositions which produce coatings having improved alkali resistance, hardness and gloss that equals or exceeds one normally seen in coatings employing solvent-based aerosol systems.

Generally, monohydric alcohols do not solubilize acrylic polymers, such as, poly(methyl methacrylate) [PMMA]. However, it has been unexpectedly discovered that certain thermoplastic polymers and copolymers of esters of the methacrylic acid, solubilize in certain mixtures of alcohol and water. Compared to other organic solvents, these solutions dry rapidly at room temperature, to produce hard and tough films. Thermoplastic acrylic polymers, as defined herein, are those 100% solid thermoplastic acrylic polymers produced as powders or pellets. A wide variety of thermoplastic acrylic polymers including polymers as well as copolymers, described below, are suitable as film formers in the aerosol compositions of the present invention.

These thermoplastic acrylic polymers are provided with a weight average molecular weight in the range of 105,000 to 200,000, preferably in the range of 105,000 to 120,000 and most preferably 105,000. The weight average molecular weight, as defined herein, is the mean of the weight relative molecular weights of the weight fractions as described on pages 6–10, Chapter II of *The Characterization of Polymers* published by Rohm and Haas Company, Philadelphia, Pa. in 1976. The weight average molecular weights are determined by gel permeation chromatography as described on page 4, Chapter IV of *The Characterization of Polymers* published by Rohm and Haas Company, Philadelphia, Pa. in 1976, utilizing polymethyl methacrylate as the standard.

These thermoplastic acrylic polymers exhibit a glass transition temperature (Tg) varying from 35° C. to 105° C., preferably from 35° C. to 40° C. and most preferably 40° C. The Tg is defined as that temperature at which the properties of the polymer, such as, viscosity, impact resistance, hardness, undergo substantial changes. The Tg of the acrylic polymer is calculated by substituting the weight percentages and the Tgs of the monomeric components of the acrylic polymer in the well known Fox Equation described in Bulletin of American Physics Society, Vol. 1, Issue 3, page 123 (1956) and on pages 20–21, Chapter IV of *The Characterization of Polymers* published by Rohm and Haas Company, Philadelphia, Pa. in 1976.

The thermoplastic acrylic polymers suitable for use in the aerosol composition of the present invention have an acid number in the range of 2 to 12, preferably in the range of 3 to 4. The acid number, as defined herein, is a number expressed as milligrams of potassium hydroxide divided by grams of the neutralized polymer.

These thermoplastic acrylic polymers may be prepared by well known polymerization techniques, such as, suspension polymerization and emulsion polymerization of ethylenically unsaturated monomers. Suspension polymerization is preferred. The acrylic content results from the polymerization of acrylate or methacrylate esters, such as, for example, methyl acrylate, ethyl acrylate, butyl acrylate, methyl methacrylate, ethyl methacrylate, butyl methacrylate, i-butyl methacrylate, acrylic acid, methacrylic acid, and acryloxypropionic acid. The thermoplastic acrylic polymers are preferably prepared by suspension polymerizing ethyl methacrylate and methacrylic acid or methyl methacrylate, ethyl acrylate and methacrylic acid, the former being the most preferred.

Among the commercially available thermoplastic acrylic polymers suitable for use herein are those made by Rohm and Haas Company, Philadelphia, Pa., under the trademark Acryloid ® solid grade acrylic resins, which are available in 100% solid powder or pelletized form.

These thermoplastic acrylic polymers are solubilized, preferably at room temperature, in a previously prepared aqueous solution of monohydric alcohol, such as isopropanol, n-butanol or 3A alcohol (by weight-95% ethanol and 5% isopropanol) to form a solubilized acrylic solution. Isopropanol is preferred. The aqueous solution is produced by dissolving by weight 60% to 95%, preferably 70% monohydric alcohol in water. The term "solubilized" as defined herein means "dissolved" or "go in solution." It is desirable to dissolve monohydric alcohol in water before solubilizing the thermoplastic acrylic polymer therein. Such a step appears to prevent the alcohol from swelling the polymer and causing haze in the resulting aqueous solution.

Table 1 below provides the solubility data obtained by solubilizing 40% by weight of the thermoplastic acrylic polymer in various monohydric alcohols at various alcohol to water weight ratios:

TABLE 1

| Alcohol/water | N-butanol | 3A alcohol (95% ethanol, 5% IPA) |
|---|---|---|
| 50/50 | Insoluble | Insoluble |
| 60/40 | Partially soluble | Insoluble |
| 70/30 | Soluble | Partially soluble |
| 80/20 | Soluble | Partially soluble |
| 90/10 | Soluble | Soluble |
| 100% Alcohol | Insoluble | Insoluble |

The weight percentage of the thermoplastic acrylic polymer being solubilized in the aqueous solution of monohydric alcohol is adjusted in accordance with the desired drying rate of the resultant coating. By lowering the weight percentage of the solubilized thermoplastic acrylic polymer, faster drying rates of the resultant coating composition are achieved. The weight percentage of the thermoplastic acrylic polymer solubilized in the aqueous solution of monohydric alcohol and water may be varied from 5% to 45%, preferably front 30% to 40%, most preferably at 40%, all in the weight percentage of the solubilized acrylic solution.

Table 2 below provides the solubility range of the thermoplastic acrylic polymer (Resin) solubilized at various isopropanol (IPA) to water weight ratios:

TABLE 2

| IPA/Water | 30% solid Resin | 40% solid Resin | 50% solid Resin |
|---|---|---|---|
| 50/50 | Insoluble | Insoluble | Insoluble |
| 60/40 | Insoluble | Insoluble | Insoluble |
| 70/30 | Soluble | Soluble | Soluble |
| 80/20 | Soluble | Soluble | Soluble |
| 90/10 | Soluble | Soluble | Soluble |
| 100% IPA | Insoluble | Insoluble | Insoluble |

The appearance of the coating resulting from the foregoing aerosol coating composition is flat. However, the gloss of the resultant coating may be varied by blending the solubilized acrylic solution with a controlling amount of a water-based acrylic polymer. The "controlling amount" is defined as the amount of water-based acrylic polymer in weight percentage sufficient to achieve a desired degree of gloss and alkali resistance to a coating resulting therefrom. By increasing the amount of the water-based polymer blended with the solubilized acrylic solution, one is able to achieve a more glossy coating. The water-based acrylic polymers suitable for use in the present invention comprise a water-soluble acrylic polymer, a water-reducible acrylic polymer or a combination of the two. The water-soluble acrylic polymer is preferred.

The water-soluble acrylic polymer suitable for use in the present invention is provided with a weight average molecular weight in the range of 20,000 to 250,000, preferably 200,000, as determined by gel permeation chromatography, based on poly methyl methacrylate as the standard, an acid number typically in the range of 30 to 160, preferably 100 and a Tg in the range of 30° C. to 140° C., preferably 45° C. The water-soluble acrylic polymer comprises from about 40% to 60% Butyl acrylate and 20% to 40% methyl methacrylate and with lower levels of styrene and methyl acrylate. The desired degree of gloss and alkali resistance on the coatings produced from the aerosol coating composition of the present invention is obtained by blending by weight 2% to 12%, preferably 8%, of the water-based acrylic polymer with the solubilized acrylic solution. These weight percentages are based on the total weight of the blend comprising the water-soluble acrylic polymer and the solubilized acrylic solution.

A number of water-soluble acrylic polymers sold by Rohm and Haas Company, under the trademark known as Acrysol ® acrylic dispersion resins are suitable for use in this invention.

As stated earlier, the water-based acrylic polymer may comprise a water-reducible, low molecular weight acrylate copolymer having copolymerized units of an alkyl acrylate and an alkyl methacrylate, wherein the alkyl group has 3 to 5 carbon atoms. The preferred copolymers comprise 5% to 20% butyl acrylate and from 30% to 60% isobutyl methacrylate by weight. In addition, the composition may comprise 10% to 30% by weight of a copolymerized drying oil, such as, linseed oil, soya oil, tung oil, sunflower oil or other polyunsaturated oils. Finally, the composition may comprise 10% to 20% by weight of olefinically unsaturated acid, or acid anhydride, such as acrylic acid, methacrylic acid, maleic acid and the like or an anhydride thereof. The weight average molecular weight of the copolymer is in the range of 300 to 20,000, preferably from 6000 to 12,000 and most preferably from 8000 to 10,000. The desired degree of gloss and alkali resistance on the coatings produced from the aerosol coating composition of the present invention is obtained by blending by weight 2% to 30%, preferably 8%, of the water-reducible, low molecular weight acrylate copolymer with the solubilized acrylic solution. These weight percentages are based on the total weight of the blend comprising the water-reducible, low molecular weight acrylate copolymer and the solubilized acrylic solution.

A water-reducible, low molecular weight copolymer of butyl acrylate and isobutyl methacrylate having a weight average molecular weight of 9000 is most preferred.

As stated earlier, the water-based acrylic polymer may comprise a combination of water-soluble and water-reducible acrylic polymers. In order to form such a combination, the water-reducible acrylic polymer is neutralized and the viscosity reduced with water to prevent precipitation of the polymer. The neutralization can occur before or after the dryers are added to the polymer but typically before reduction with water. After water is added, the water-soluble acrylic polymer can be added to form the combination. If the above order of addition is not adhered to, it would be more difficult to form the combination of water-soluble and water-reducible acrylic polymers.

The weight ratio of the water-soluble acrylic polymer to the water-reducible, low molecular weight copolymer should be 20/80 to 80/20, while the preferred weight ratio should be from 40/60 to 60/40. When weight ratios are outside of the above ranges, the combinations are less stable and the coatings produced therefrom are inferior.

The present invention contemplates an aerosol composition adopted for providing a continuous film on a substrate upon discharge from suitable containment means, such as, for example, an aerosol can. The propellant-active carrier system employed in the present invention preferably includes dimethyl ether and water. Dimethyl ether is a colorless, stable, polar liquid with a boiling point of minus 25° C. The aerosol composition of the present invention may comprise from 5% to 60%, preferably from 25% to 50% of dimethyl ether by weight, based on the total weight of the aerosol composition. While it is preferred that dimethyl ether is the sole propellant, under some circumstances, however, 0% to up to 50% by weight of dimethyl ether may be replaced by another liquid propellant, such as, an aliphatic hydrocarbon or a fluorinated hydrocarbon. Further, if desired, a gaseous propellant, such as nitrogen, carbon dioxide, nitrous oxide, may also be used.

Water is present in the composition of the present invention in an amount varying from 10% to 70%, preferably varying from 20% to 60% by weight of the total weight of the aerosol paint composition.

The aerosol coating composition of the present invention may further include, additives, such as a surfactant, pigment, pH stabilizer, antifoam agent, plasticizer, drying agents. In general, there will be less than 20%, preferably less than 15% by weight, based on the total weight of the composition, of the pigment. Suitably, the remaining foregoing additives, when present, would not exceed 3% by weight, based on the total weight of the composition, for each additive, and usually only up to 1% or 2% of each other additive would be present.

A blend of a thermoplastic acrylic polymer solubilized in a previously prepared aqueous solution of a monohydric alcohol with a water-based acrylic polymer in a water-based carrier and propellant system having dimethyl ether and water provides paint compositions with the desired film-forming and drying properties that are not obtained when the water-reducible, low molecular weight copolymer is employed without the water-soluble acrylic polymer. Coating properties are further enhanced when the water-reducible low molecular weight polymer undergoes air cure.

The present coating composition is suitable for use in many coating applications, such as, for example, wood finishes, printing inks, coatings on solvent sensitive substrates, such as, leather, sealers, over print varnishes, label varnishes, paper coatings, floor finishes, ceramic binders, vacuum metallized coatings, coatings over polymeric substrates, traffic and zone marking paints, glaze coatings, wall coatings, clear coatings on delicate substrates, such as those of art objects.

The following test procedures were employed in evaluating the physical and chemical properties of the foregoing aerosol coating compositions. Unless and otherwise stated, all the tests were conducted under the standardized procedures developed by The American Society of Testing Materials, (ASTM), Philadelphia, Pa.

| TEST PROCEDURES | |
| --- | --- |
| Dry to Touch time | ASTM D-1640 |
| Gloss | ASTM D-523 (The 20 degree and 60 degree gloss were measured with glass meters manufactured by the Gardner Instrument Company). |
| Pencil Hardness | ASTM D-1737 (6H being the hardest pencil and 6B being the softest pencil) |
| Cross Hatch Adhesion | ASTM D-3359 (on the scale of 1 through 10, 1 represents poor adhesion and 10 represents no loss of adhesion) |
| Water resistance | A spot of water was left on the coated surface for a specified length of time. Pencil hardness was measured at the start and at the end of the test. |
| Alkali resistance | A spot of 7% solution of $NH_4OH$ was left on the coated surface for a specified length of time. Appearance was checked at the start and at the end of the test. |
| Water immersion | A coated panel was immersed in water for 2 hours. Pencil hardness was measured at the start and at the end of the test. |
| Wet adhesion | Cross hatch adhesion was measured |

-continued
TEST PROCEDURES immediately after the coated panel was removed from the water immersion test described above. Another cross hatch adhesion was measured 2 hours later.

Some embodiments of the invention will now be described in detail in the following examples.

The three clear water-based compositions were prepared as follows:

85 parts by weight of isopropyl alcohol was dissolved in 15 parts by weight of deionized water to form an aqueous solution. Isopropyl alcohol @91% strength with a flash point of 18° C., vapor pressure of 34 mm Hg at 20° C. and a specific gravity of 0.818 at 20° C. supplied by Union Carbide Inc., was used. 100% solid pellets of the thermoplastic acrylic polymer were then dissolved in the the aqueous solution at 40% by weight of the solution.

To the above described solution, water-reducible, low molecular weight copolymer at three different strengths, namely 27%, 19% and 0% by weight, was added to analyze the effect of the water-reducible, low molecular weight copolymer on gloss, adhesion, alkali resistance, and water spot effect on the coating resulting therefrom.

Table 3 below provides the composition of the three sample formulations.

TABLE 3

| COMPONENTS | Sample A | Sample B | Sample C |
| --- | --- | --- | --- |
| 40% solution of the thermoplastic acrylic polymer in 85/15 IPA/Water | 12% | 20% | 39% |
| water-reducible, low molecular weight acrylic copolymer | 27% | 19% | 0% |
| 85/15 IPA/Water | 61% | 61% | 61% |
| TOTAL | 100% | 100% | 100% |

Each of these sample formulations were tested for 60 degree gloss, cross hatch adhesion, alkali resistance (2 hours), and water resistance (2 hours). Adhesion of 10 demonstrates the best adhesion. It is clear from Table 4, below, that there is a direct relationship between the amount of the water-reducible, low molecular weight acrylate copolymer present in the formulation and the resulting gloss of the overall system, i.e., as the amount of the water-reducible, low molecular weight acrylate copolymer is increased, the gloss of the coating resulting therefrom is also improved.

TABLE 4

| TESTS | Sample A | Sample B | Sample C |
| --- | --- | --- | --- |
| 60 degree gloss | 90+/−2 | 70+/−2 | 50+/−2 |
| Adhesion | 10 | 10 | 10 |
| Alkali resistance (2 hrs) | fail | fail | pass |
| Water resistance (2 hrs) | pass | pass | pass |

The following tests were conducted to demonstrate the advantages of the present coating over the conventional coatings.

Two white paint compositions were prepared, a conventional composition using water-reducible, low molecular weight acrylate copolymer as the resin and a composition based on the present invention, which comprises a blend of 40% by weight of the thermoplastic acrylic polymer in a 70/30 mixture of Isopropyl alcohol and water with the water-soluble acrylic polymer.

Both these compositions utilized Triton ® CF-10 non-ionic alkylaryl polyether supplied by The Industrial Chemical Division of Union Carbide Chemical and Plastic Co. Triton ® CF-10 non-ionic alkylaryl polyether is supplied as a liquid and it is utilized as a low foaming wetting agent for pigments used in latex paints.

Both the compositions were pigmented with the white Ti-pure ® R-900 titanium dioxide pigment supplied by dupont de Nemours Co. Inc., Wilmington, Del.

The conventional composition further included metallic dryers at 0.15 parts by weight of cobalt naphthenate and 0.20 parts by weight of manganese naphthenate supplied by Tenneco Chemicals Inc.

Table 5 below summarizes the composition on a weight percentage basis.

TABLE 5

| Component of the composition | Conventional composition | The present invention composition |
| --- | --- | --- |
| water-reducible, low molecular weight acrylate copolymer | 37.92 | — |
| 40% thermoplastic acrylic polymer in 70/30 IPA/Water | — | 40.90 |
| water-soluble acrylic polymer | — | 4.50 |
| Isopropyl alcohol | — | 4.50 |
| Triton @ CF-10 | 1.07 | 1.13 |
| Ti-Pure ® R-900 titanium dioxide pigment | 15.77 | 15.77 |
| 70/30 IPA/Water | 44.89 | 33.20 |
| Dryer | 0.35 | — |
| TOTAL | 100% | 100% |

Both compositions were applied as a coating having 25.4 microns (1.0 mil) ±2.5 microns (0.10 mils) Dry Film thickness over steel panels. The specifications of the coating from both of these compositions is outlined in Table 6 below:

TABLE 6

| Specifications | Conventional coating | Present invention coating |
| --- | --- | --- |
| Weight of solids | 39.59 | 34.54 |
| Pigment/binder ratio | 0.69 | 0.89 |
| Pigment Volume Concentration | 15.76 | 21.08 |
| VOC in lbs/gallon | 5.40 | 5.70 |

72 hours later the coated steel panels were tested, under the identical ambient conditions. The summary of the test results is outlined in Table 7 below:

TABLE 7

| Tests | Conventional coating | Present invention coating |
| --- | --- | --- |
| Dry to Touch (DTT) | in 20–25 minutes | in 10–15 minutes |
| 60 degree gloss | 80 | 85 |
| 20 degree gloss | 50 | 65 |
| Adhesion (over B-1000) | 10 | 10 |
| Hardness | 2B-B | HB-F |
| Water resistance | 5B (soft) | HB (no effect) |
| Alkali resistance (1 hr) | failed | HB (no effect) |
| Alkali resistance (2 hrs) | failed | HB (no effect) |
| Alkali resistance (3 hrs) | failed | HB (no effect) |
| Alkali resistance (4 hrs) | failed | very few blisters |
| Water immersion | 5B | 2B |
| Wet adhesion (Immediate) | 10 | 1 |
| Wet adhesion (2 hrs | 10 | 10 |

| Tests | Conventional coating | Present invention coating |
| --- | --- | --- |
| recovery) | | |

The foregoing Table 7 shows that the cured coating made from the present invention provides improvement over conventional coating in the following areas:
1. Faster dry to touch time;
2. Improved 20 and 60 degree gloss;
3. Increased hardness; and
4. Improved alkali resistance.

I claim:

1. An aqueous aerosol coating composition comprising a blend of a thermoplastic acrylic polymer solubilized in an aqueous solution of a monohydric alcohol to form a solubilized acrylic solution with a controlling amount of a water-based acrylic polymer for providing an increased degree of gloss and alkali resistance, wherein said thermoplastic acrylic polymer has a weight average molecular weight in the range of 105,000 to 200,000, an acid number in the range of 2 to 12 and is polymerized from ethylenically unsaturated monomers and wherein, said water-based acrylic polymer is polymerized from ethylenically unsaturated monomers and is selected from the group consisting of a water-soluble acrylic polymer, water-reducible acrylic polymer and a combination thereof.

2. The coating composition of claim 1 wherein said controlling amount of said water-soluble acrylic polymer in said blend is in the range of 2% to 12% by weight of said blend and wherein said water-soluble acrylic polymer is an acrylic polymer having a weight average molecular weight in the range of 20,000 to 200,000, a Tg in the range of 30° C. to 140° C. and an acid number in the range of 30 to 160.

3. The composition of claim 1 further comprises less than 20% by weight of a pigment and less than 3% by weight of a surfactant, pH stabilizer, antifoam agent, plasticizer, drying agent or a combination thereof.

4. A coating of the composition of claim 1 on the surface of a substrate.

5. The composition of claim 1 wherein said aqueous solution comprises 60% to 95% by weight of said monohydric alcohol selected from the group consisting of isopropanol, n-butanol and 3A alcohol.

6. The composition of claim 1 wherein said solubilized acrylic solution comprises 5% to 45% by weight of said thermoplastic acrylic polymer.

7. A method of producing an aqueous coating composition comprising:

adding a monohydric alcohol to water to form an aqueous solution;

solubilizing in said aqueous solution a thermoplastic acrylic polymer polymerized from ethylenically unsaturated monomers, said thermoplastic acrylic polymer having an acid number in the range of 2 to 12 and a weight average molecular weight in the range of 105,000 to 200,000 to form a solubilized acrylic solution;

blending a controlling amount of a water-based acrylic polymer polymerized from ethylenically unsaturated monomers with said solubilized acrylic solution to provide an increased degree of gloss and alkali resistance to a coating resulting from said aqueous coating composition.

8. An aqueous coating composition comprising a blend of a thermoplastic acrylic polymer solubilized in an aqueous solution of a monohydric alcohol to form a solubilized acrylic solution with a controlling amount of a water-based acrylic polymer for providing an increased degree of gloss and alkali resistance, wherein said thermoplastic acrylic polymer has a weight average molecular weight in the range of 105,000 to 200,000, an acid number in the range of 2 to 12 and is polymerized from ethylenically unsaturated monomers and wherein, said water-based acrylic polymer is polymerized from ethylenically unsaturated monomers.

9. A method of producing a coating on a substrate comprising:

adding a monohydric alcohol to water to form an aqueous solution;

solubilizing in said aqueous solution a thermoplastic acrylic polymer to form a solubilized acrylic solution, wherein said thermoplastic acrylic polymer is polymerized from ethylenically unsaturated monomers and said thermoplastic acrylic polymer has an acid number in the range of 2 to 12 and a weight average molecular weight in the range of 105,000 to 200,000;

blending a controlling amount of a water-based acrylic polymer with said solubilized acrylic solution to form an aqueous coating composition wherein said controlling amount of said water-based acrylic polymer provides an increased degree of gloss and alkali resistance to a coating resulting therefrom, said water-based acrylic polymer being polymerized from ethylenically unsaturated monomers;

applying said coating composition on said substrate; and drying said coating composition applied on said substrate to produce said coating on said substrate.

* * * * *